(12) United States Patent
Masaki

(10) Patent No.: US 6,509,877 B2
(45) Date of Patent: Jan. 21, 2003

(54) PORTABLE INFORMATION APPARATUS INCORPORATING RADIO COMMUNICATION ANTENNA

(75) Inventor: Toshiyuki Masaki, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/942,652

(22) Filed: Aug. 31, 2001

(65) Prior Publication Data

US 2002/0024469 A1 Feb. 28, 2002

(30) Foreign Application Priority Data

Aug. 31, 2000 (JP) ........................ 2000-262948

(51) Int. Cl.[7] ............................................... H01Q 1/24
(52) U.S. Cl. ........................................ 343/702; 375/347
(58) Field of Search ........................... 343/702, 700 MS; 329/308; 375/100, 347; 455/272, 277.1, 277.2, 275, 432

(56) References Cited

U.S. PATENT DOCUMENTS

| | | | | |
|---|---|---|---|---|
| 5,325,403 A | * | 6/1994 | Siwiak et al. | 375/100 |
| 5,373,300 A | * | 12/1994 | Jenness et al. | 343/102 |
| 5,677,698 A | | 10/1997 | Snowdon | 343/770 |
| 5,850,416 A | * | 12/1998 | Myer | 375/221 |
| 6,219,227 B1 | * | 4/2001 | Trane | 361/683 |
| 6,326,926 B1 | * | 12/2001 | Shoobridge et al. | 343/702 |
| 6,339,400 B1 | * | 1/2002 | Flint et al. | 343/702 |

FOREIGN PATENT DOCUMENTS

JP   8-78931   3/1996

OTHER PUBLICATIONS

Masaki, Toshiyuki et al., "An Antenna Arragem ent of An Information Processor", Ser. No. 09/456,986, filed Dec. 7, 1999.

Masaki, Toshiyuki, "Radio Communication Device and Electronic Apparatus Hav ing the Same", Ser. No. 09/730,554, filed Dec. 7, 2000.

* cited by examiner

Primary Examiner—Don Wong
Assistant Examiner—James Clinger
(74) Attorney, Agent, or Firm—Finnegan, Henderson, Farabow, Garrett & Dunner, L.L.P.

(57) ABSTRACT

This invention provides a portable information apparatus which has a main body of the portable information apparatus, a display unit attached to the main body of the portable information apparatus, a plurality of radio communication diversity antennas provided to the display unit, and a radio communication antenna which is provided to the display unit at a position between at least one pair of radio communication diversity antennas of the plurality of radio communication diversity antennas.

16 Claims, 7 Drawing Sheets

FIG. 9  —— Horizontal  —— Vertical

FIG. 10  —— Horizontal  —— Vertical

PORTABLE INFORMATION APPARATUS INCORPORATING RADIO COMMUNICATION ANTENNA

CROSS-REFERENCE TO RELATED APPLICATIONS

This application is based upon and claims the benefit of priority from the prior Japanese Patent Application No. 2000-262948, filed Aug. 31, 2001, the entire contents of which are incorporated herein by reference.

BACKGROUND OF THE INVENTION

1. Field of the Invention

The present invention relates to a portable information apparatus that incorporates a radio communication antenna and, more particularly, to a notebook type personal computer that incorporates a radio communication antenna.

2. Description of the Related Art

Conventionally, notebook type personal computers (to be referred to as notebook PCs hereinafter) that incorporate radio communication antennas have been developed. For example, a notebook PC disclosed in U.S. Pat. No. 5,677,698 realizes a compact antenna built-in type notebook PC by attaching two slot antennas to the back surface side of its liquid crystal display. Also, this notebook PC adopts a diversity wireless LAN system, which mounts two antennas.

However, according to the technique disclosed in U.S. Pat. No. 5,677,698 as the prior art, a size reduction is achieved using a dielectric case. However, since the antennas require a large area, they are mounted on the back surface side of a housing of the liquid crystal display. Hence, the antennas radiate strongly on the back surface side of the liquid crystal display but less on the front surface side.

In recent years, a new short-range radio communication scheme Bluetooth has been developed, and many antennas are mounted to use a plurality of radio communication schemes.

For example, a combination of 802.11b wireless LAN and Bluetooth using the identical 2.4-GHz band, and a combination of the future 802.11a wireless LAN using the 5-GHz band and Bluetooth in future may be used.

However, commercially available notebook PCs having radio communication functions incorporate a single wireless LAN communication function, PHS communication function, or the like alone.

Therefore, when antennas compatible to these radio communication functions are mounted on a conventional notebook PC, interference among antennas and a reduction of the effect of the diversity antenna may occur.

BRIEF SUMMARY OF THE INVENTION

The present invention has been made in consideration of the above situation, and has as its object to provide a portable information apparatus which can mount a plurality of antennas compatible to a plurality of radio communication schemes, and incorporates radio communication antennas that can obtain radiation characteristics with good balance on both the front and back surface sides of the portable information apparatus.

Therefore, according to the first aspect of the present invention, a portable information apparatus comprises a main body of the portable information apparatus, a display unit attached to the main body of the portable information apparatus, a plurality of radio communication diversity antennas provided to the display unit, and a radio communication antenna which is provided to the display unit at a position between at least one pair of radio communication diversity antennas of the plurality of radio communication diversity antennas.

According to this invention, high radiation performance of the radio communication antenna can be educed, and the influences of fading on the diversity antennas can be reduced.

According to the second aspect of the present invention, in the first aspect, the display unit comprises a liquid crystal panel, and a housing fixing the liquid crystal panel, the plurality of radio communication diversity antennas are respectively attached to a plurality of first antenna boards, and the radio communication antenna is attached to a second antenna board, and the plurality of first antenna boards and the second antenna board are respectively attached to the housing on the back surface side of the liquid crystal panel with the plurality of radio communication diversity antennas and the radio communication antenna being located on an upper portion of the liquid crystal panel to be separated by a predetermined spacing.

According to this invention, the plurality of radio communication diversity antennas and radio communication antenna can have substantially uniform radiation characteristics on the front and back surface sides of the display unit.

Furthermore, according to the third aspect of the present invention, a portable information apparatus comprises a main body of the portable information apparatus, a display unit attached to the main body of the portable information apparatus, diversity antennas provided to the display unit and including at least two antennas, a first radio communication unit, connected to the diversity antennas, making a communication by a first radio communication scheme using a diversity function, a second radio communication unit, connected to one of the at least two antennas, making a communication by a second radio communication scheme different from the first radio communication scheme, and a switching unit switching the first and second radio communication units.

According to this invention, a plurality of radio communication schemes can be used by a fewer number of antennas, and a low-cost, compact notebook PC can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

A notebook PC that incorporates radio communication antennas according to an embodiment of the present invention will be explained below.

<First Embodiment>

In this embodiment, a case will be explained below wherein 802.11b wireless LAN using the 2.4-GHz band and Bluetooth are incorporated in a notebook PC.

Figure 1:
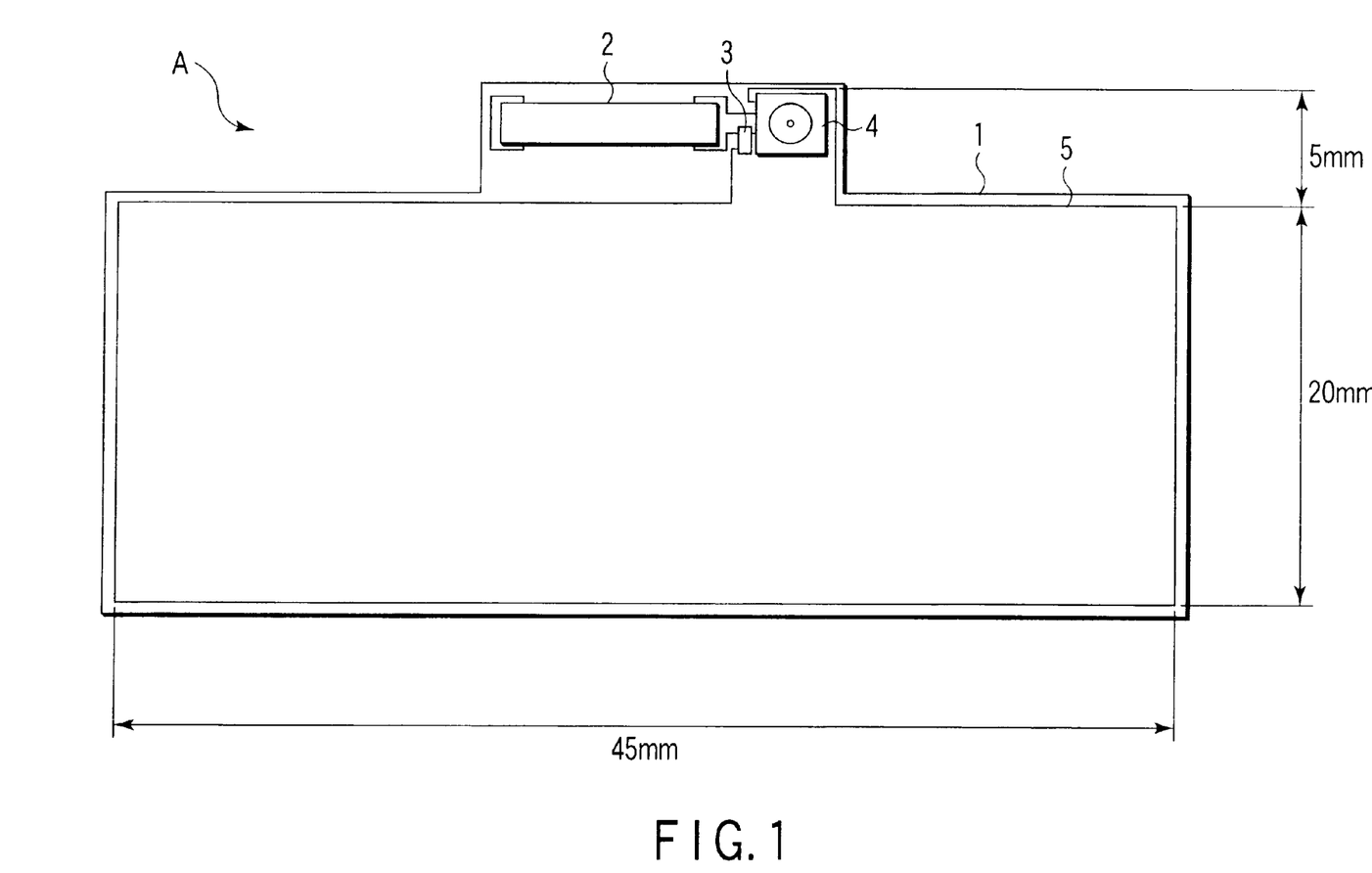
FIG. 1 is a plan view showing an antenna board of an antenna built in a notebook PC according to the first embodiment of the present invention.

FIG. 1 shows an antenna board of antennas built in a notebook PC according to the first embodiment of the present invention.

As shown in FIG. 1, an antenna board A comprises a single-sided glass epoxy substrate 1, a chip antenna 2 mounted on the single-sided glass epoxy substrate 1, a matching inductor 3, and a coaxial connector 4 for connecting a module on the main body side via a coaxial cable. The chip antenna 2 is connected to the coaxial cable via the matching inductor 3 and coaxial connector 4.

A GND pattern 5 on the glass epoxy substrate 1 has a total perimeter length, which is $0.8\lambda$ to $1.25\lambda$ of the frequency band, so as to assure a stable band. In this embodiment, the GND pattern 5 is defined by a rectangular shape having a length of 20 mm and a width of 45 mm, and another portion vertically projecting about 5 mm around the coaxial connector 4.

In this embodiment, the chip antenna serves as a wireless LAN antenna and Bluetooth antenna.

Figure 2:
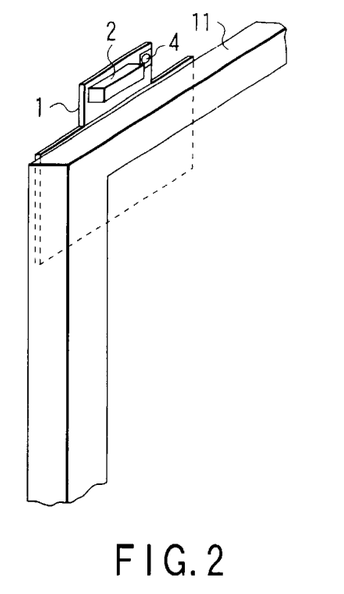
FIG. 2 is a perspective view showing the antenna board shown in FIG. 1, which is attached to the back surface of a liquid crystal panel of the notebook PC.
Figure 3:
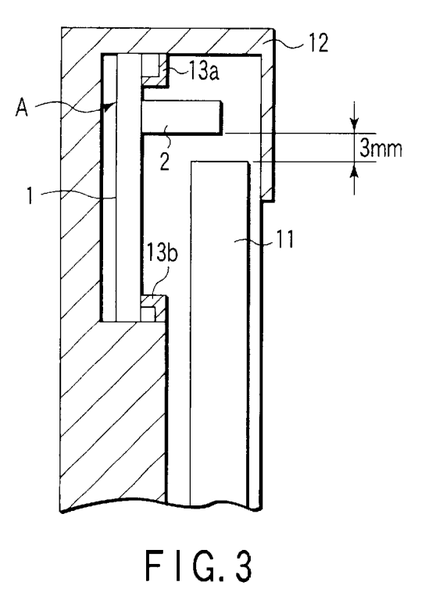
FIG. 3 is a sectional view of a display unit which mounts the antenna board shown in FIG. 2.

FIG. 2 is a perspective view showing the antenna board shown in FIG. 1, which is attached to the back surface of a liquid crystal panel of the notebook PC. FIG. 3 is a sectional view of a display unit that mounts the antenna board shown in FIG. 2. Note that the same reference numerals denote the same parts as in FIG. 1.

As shown in FIGS. 2 and 3, the antenna board A is mounted on the back surface side of a liquid crystal panel 11, so that the chip antenna 2 mounted on the antenna board A is located on the upper portion of the liquid crystal panel 11. In this case, the spacing between the upper end of the liquid crystal panel 11 and the chip antenna 2 is 3 mm. with this layout of the chip antenna 2, the radiation characteristics on the front and back surface sides of the liquid crystal panel 11 can be prevented from offsetting. Also, the display unit including the liquid crystal panel can have a low profile.

The antenna board A is fixed to a housing 12 by stationary portions 13a and 13b formed on the housing 12 of the display unit of the portable information apparatus. In this embodiment, the antenna board A is fixed using the stationary portions 13a and 13b formed on the housing, but the fixing method of the antenna board A to the housing 12 is not limited to such specific method. That is, the antenna board A need only be fixed to the housing 12 on the back surface side of the liquid crystal panel 11, so that the chip antenna 2 mounted on the antenna board A is located on the upper portion of the liquid crystal panel 11.

Figure 4:
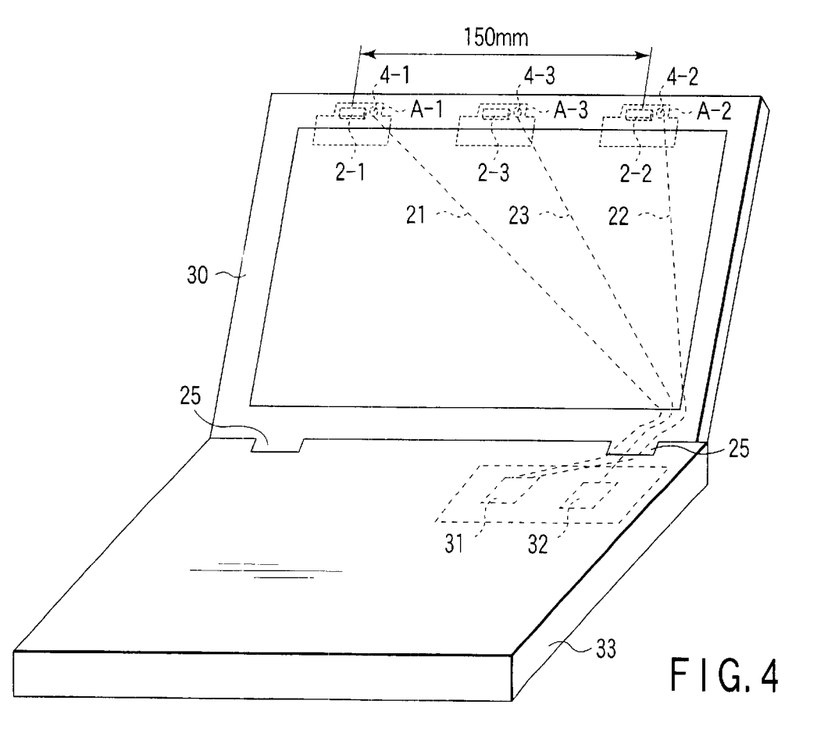
FIG. 4 is a perspective view for explaining the mounting positions of two 802.11b wireless LAN diversity antennas, and a Bluetooth antenna.

FIG. 4 is a perspective view for explaining the mounting positions of two 802.11b wireless LAN diversity antennas and a Bluetooth antenna. Note that the same reference numerals denote the same parts as in FIGS. 1 to 3.

As shown in FIG. 4, antenna boards A-1 to A-3 are attached to a housing 12 on the back surface side of the liquid crystal panel 11 of a display unit 30, which is pivotally attached to a main body 33 of the notebook PC via hinges 25.

The antenna boards A-1 and A-2 mount 802.11b wireless LAN diversity antennas 2-1 and 2-2. The antenna board A-3 mounts a Bluetooth antenna 2-3.

That is, the Bluetooth antenna 2-3 is located between the 802.11b wireless LAN diversity antennas 2-1 and 2-2. The mounting method of the antenna boards A-1 to A-3 is as shown in FIG. 3.

Since the distance between the wireless LAN antennas 2-1 and 2-2 on the upper portion of the liquid crystal display 11 must satisfy $(2n+1)/4\lambda (n=1, 2, 3, \ldots)$ at $3/4\lambda$ or more, n=2, n=3, or n=4 is preferable in case of an A4-size notebook PC. Likewise, n=2 or n=3 is preferable in case of a B5-size notebook PC.

In this embodiment, the two wireless LAN antennas 2-1 and 2-2 are separated by a distance of around 150 mm (n=2). The short-range radio communication Bluetooth has no diversity function unlike a wireless LAN since it is a low-cost communication function, and one Bluetooth antenna 2-3 is mounted. To implement nondirectionality of the Bluetooth antenna 2-3, the antenna 2-3 is preferably located near or at the center of the housing. Therefore, the Bluetooth antenna 2-3 is laid out between the two wireless LAN antennas 2-1 and 2-2.

Furthermore, a wireless LAN radio communication module 31 and Bluetooth radio communication module 32 are incorporated in the main body 33, and are connected to coaxial connectors 4-1 to 4-3 on the antenna boards A-1 to A-3 via coaxial cables 21 to 23 that run through one hinge 25. With this structure, thick modules can be incorporated in the main body, and a low-profile display unit can be realized.

Figure 5:
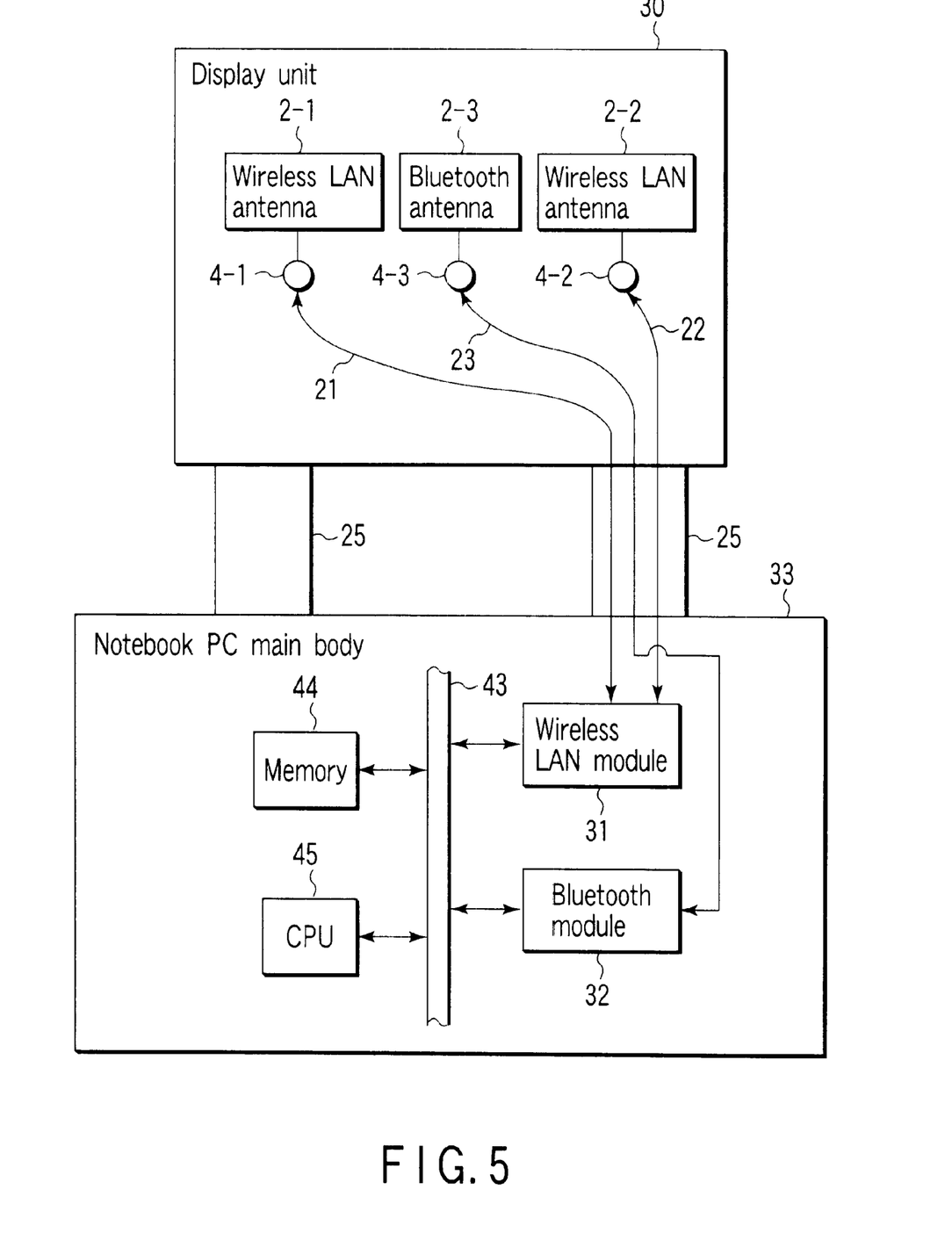
FIG. 5 is a block diagram showing the hardware arrangement of the notebook PC according to an embodiment of the present invention.

FIG. 5 shows the hardware arrangement of the notebook PC according to an embodiment of the present invention. Note that FIG. 5 illustrates only features of this embodiment, and does not illustrate a keyboard controller, display controller, and the like as original functions of the notebook PC.

As shown in FIG. 5, the wireless LAN antennas 2-1 and 2-2 attached to the back surface side of the liquid crystal panel of the display unit are connected to the wireless LAN radio communication module 31 via the coaxial cables 21 and 22 connected to the coaxial connectors 4-1 and 4-2.

On the other hand, the Bluetooth antenna 2-3 attached to the back surface side of the liquid crystal panel of the display unit is connected to the Bluetooth radio communication module 32 via the coaxial cable 23 connected to the coaxial connector 4-3.

The wireless LAN radio communication module 31 and Bluetooth radio communication module 32 are connected to a CPU bus 43. To the CPU bus 43, a CPU 45 for controlling the entire notebook PC, and a memory 44 for storing reception data from the wireless LAN antennas 2-1 and 2-2 and Bluetooth antenna 2-3, and transmission data to these antennas 2-1 to 2-3 are connected.

Figure 6:
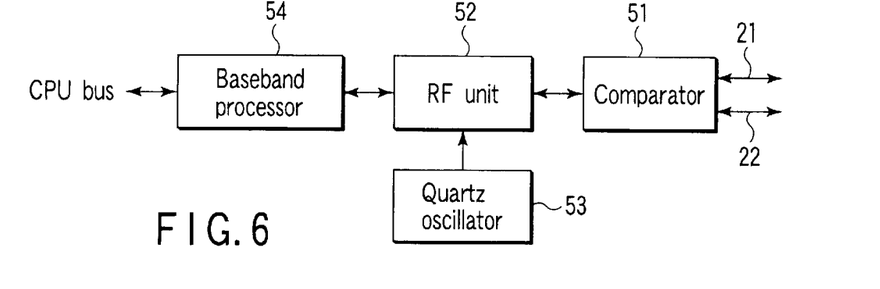
FIG. 6 is a block diagram showing a wireless LAN module.

FIG. 6 is a block diagram showing the wireless LAN module.

As shown in FIG. 6, the wireless LAN radio communication module 31 comprises a comparator 51, RF unit 52, quartz oscillator 53, and baseband processor 54.

The comparator 51 compares the levels of two signals input from the wireless LAN antennas 2-1 and 2-2 via the coaxial cables 21 and 22, and outputs a signal having a higher signal level to the RF unit 52. Also, the comparator 51 outputs an RF signal output from the RF unit 52 to the wireless LAN antennas 2-1 and 2-2.

The RF unit 52 down-converts the RF signal output from the comparator 51 into a baseband signal on the basis of the oscillation frequency from the quartz oscillator 53. Also, the RF unit 52 converts a baseband signal output from the baseband processor 54 into an RF signal on the basis of the oscillation frequency from the quartz oscillator 53.

The baseband processor 54 A/D-converts the baseband signal output from the RF unit 52 into a digital signal that can be processed by the CPU 45 of m the notebook PC. Also, the baseband processor 54 D/A-converts digital data sent via the CPU bus 43 into an analog signal, and sends it to the RF unit 52.

Figure 7:
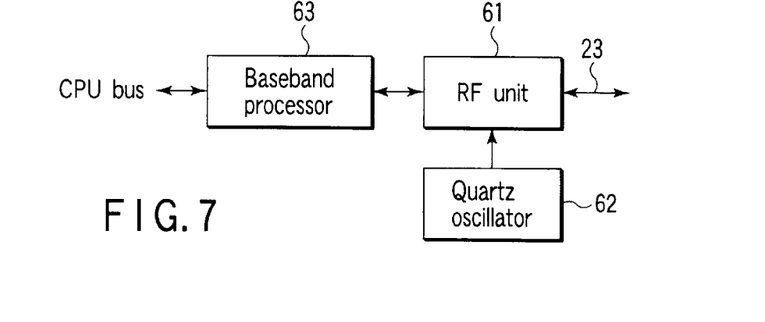
FIG. 7 is a block diagram showing a Bluetooth module.

FIG. 7 is a block diagram showing the Bluetooth module.

As shown in,FIG. 7, the Bluetooth radio communication module 32 comprises an RF unit 61, quartz oscillator 62, and baseband processor 63.

The RF unit 61 down-converts an RF signal from the Bluetooth antenna 2-3 into a baseband signal on the basis of the oscillation frequency from the quartz oscillator 62. Also, the RF unit 61 converts a baseband signal output from the baseband processor 63 into an RF signal on the basis of the oscillation frequency from the quartz oscillator 62.

The baseband processor 63 A/D-converts a baseband signal output from the RF unit 61 into a digital signal that can be processed by the CPU 45 of the notebook PC. Also, the baseband processor 63 D/A-converts digital data sent via the CPU bus 43 into an analog signal and sends it to the RF unit 61.

Therefore, the notebook PC of this embodiment operates as follows.

When data is transmitted from the wireless LAN antennas 2-1 and 2-3, the CPU 45 stores transmission data in the memory 44, and sends the transmission data stored in the memory 44 to the wireless LAN radio communication module 31 via the CPU bus 43.

In the wireless LAN module, the baseband processor 54 D/A-converts the transmission data into baseband analog transmission data, and outputs it to the RF unit 52. The RF unit 52 converts the baseband transmission data into RF transmission data used in wireless LAN communications on the basis of the oscillation frequency from the quartz oscillator 53, and outputs it to the comparator 51.

The comparator 51 outputs the RF transmission data from the RF unit 52 to the wireless LAN antennas 2-1 and 2-2 via the coaxial cables 21 and 22. In this manner, the transmission data is transmitted from the wireless LAN antennas 2-1 and 2-2.

On the other hand, when data is received from the wireless LAN antennas 2-1 and 2-2, two signals from the wireless LAN antennas 2-1 and 2-2 are input to the comparator 51.

Upon receiving the signals from the two wireless LAN antennas 2-1 and 2-2, the comparator 51 selects a signal having a higher signal level, and outputs it to the RF unit 52. The RF unit 52 down-converts the signal output from the comparator 51 into a baseband signal on the basis of the oscillation frequency from the quartz oscillator 52, and outputs it to the baseband processor 54.

The baseband processor 54 A/D-converts the signal output from the RF unit 52 into a digital signal that can be processed by the CPU 45 of the notebook PC, and outputs it onto the CPU bus. The received signal output onto the CPU bus is also stored in the memory 44.

A case will be explained below wherein data is transmitted from the Bluetooth antenna 2-3.

In this case, the CPU 45 stores transmission data in the memory 44, and sends the transmission data stored in the memory 44 to the Bluetooth radio communication module 32 via the CPU bus 43.

In the Bluetooth radio communication module 32, the baseband processor 63 D/A-converts the transmission data into baseband analog transmission data, and outputs it to the RF unit 61. The RF unit 61 converts the baseband transmission data into RF transmission data used in Bluetooth radio communications on the basis of the oscillation frequency from the quartz oscillator 62, and outputs it to the Bluetooth antenna 2-3 via the coaxial cable 23. In this manner, transmission data is transmitted from the Bluetooth antenna 2-3.

When data from the Bluetooth antenna 2-3 is received, a signal from the Bluetooth antenna 2-3 is input to the RF unit 61.

The RF unit 61 down-converts the signal from the Bluetooth antenna 2-3 into a baseband signal on the basis of the oscillation frequency from the quartz oscillator 62, and outputs it to the baseband processor 63.

The baseband processor 63 A/D-converts the signal output from the RF unit 61 into a digital signal that can be processed by the CPU 45 of the notebook PC, and outputs it onto the CPU bus. The received signal output onto the CPU bus is also stored in the memory 44.

Figure 8:
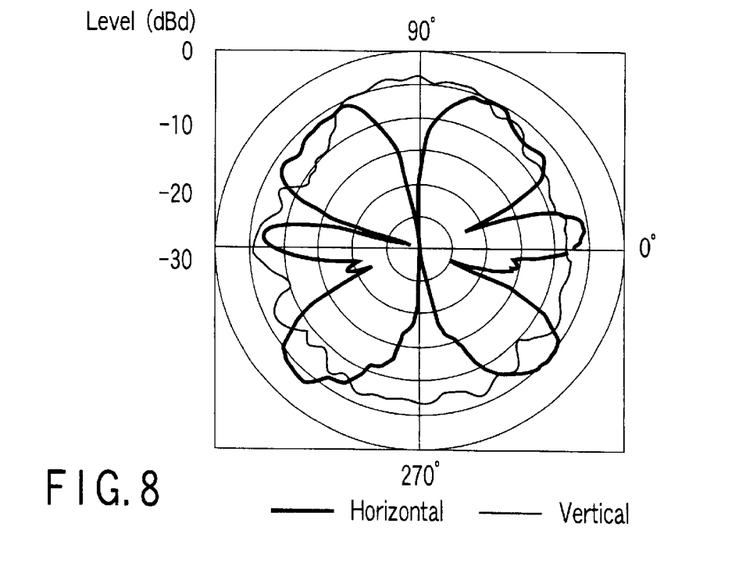
FIG. 8 shows the radiation characteristics of a Bluetooth antenna 2-3.
Figure 9:
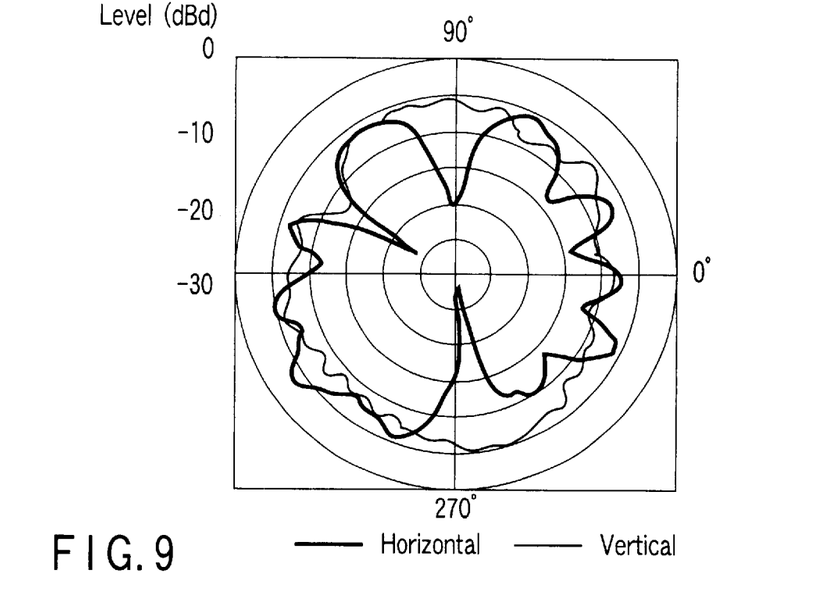
FIG. 9 shows the radiation characteristics of a wireless LAN antenna 2-1.
Figure 10:
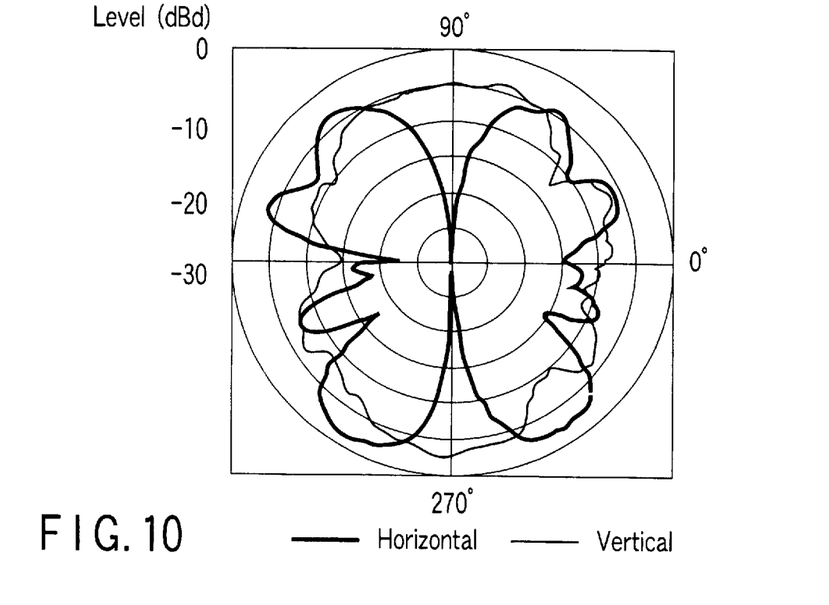
FIG. 10 shows the radiation characteristics of a wireless LAN antenna 2-2.

FIG. 8 shows the radiation characteristics of the Bluetooth antenna 2-3, and FIGS. 9 and 10 respectively show the radiation characteristics of the wireless LAN antennas 2-1 and 2-2.

As shown in FIGS. 8 to 10, the Bluetooth antenna 2-3 and the two wireless LAN antennas 2-1 and 2-2 can provide good radiation characteristics. Especially, the radiation characteristics of vertically polarized plane waves are nearly nondirectional since they are free from dips.

Figure 11:
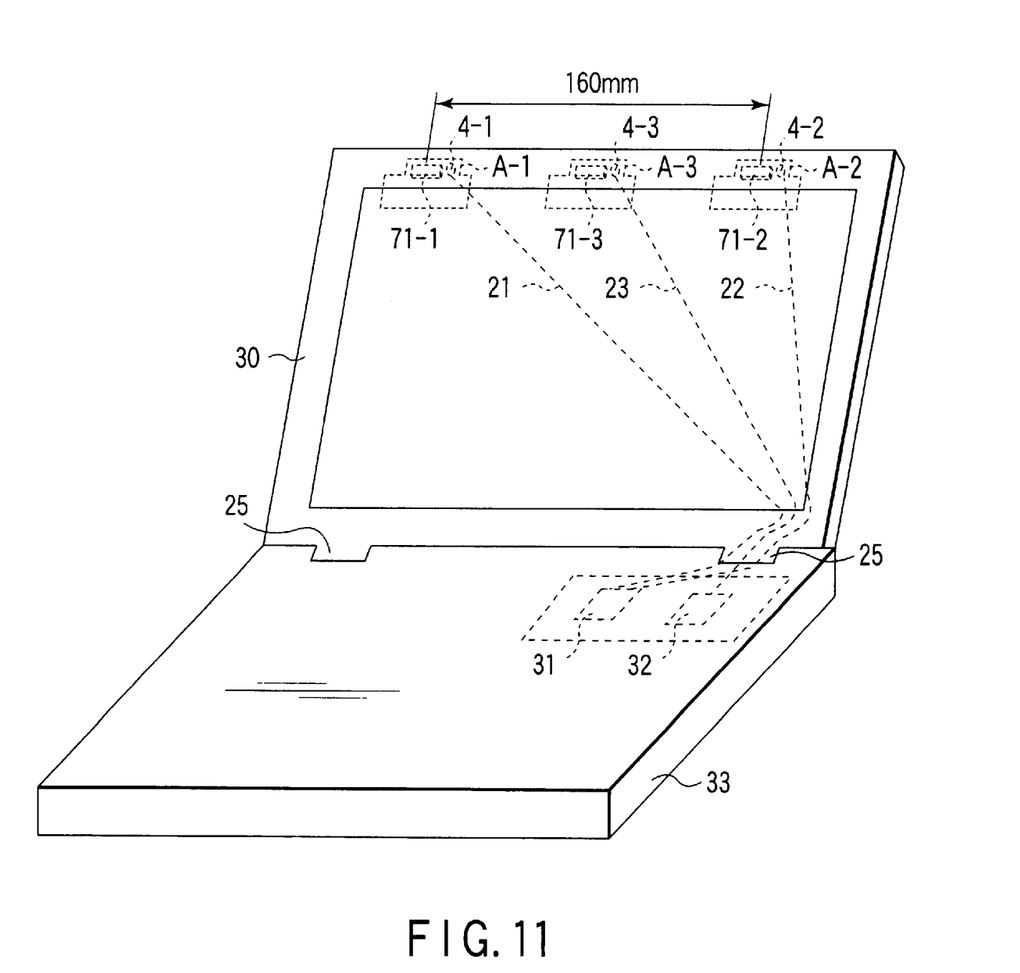
FIG. 11 is a perspective view for explaining a case wherein a notebook PC incorporates antennas for the 802.11a wireless LAN using the 5-GHz band, and a Bluetooth antenna.

A case will be explained below using FIG. 11 wherein 802.11a wireless LAN antennas using the 5-GHZ band, and a Bluetooth antenna are incorporated. In this case, since these antennas use different frequency bands, they can be used at the same time. Note that the same reference numerals denote the same parts as in FIG. 4.

The three antennas hardly interfere with each other when they are separated by the largest possible distance. Since $(2n+1)/4\lambda (n=1, 2, 3, \ldots)$ must be satisfied at $3/4\lambda$ or more to obtain a sufficient diversity effect of the wireless LAN and to reduce interference among the antennas, n=4, n=5, . . . , or n=9 is preferable in case of an A4-size notebook PC. Likewise, n=4, n=5, . . . , or n=8 is preferable in case of a B5-size notebook PC.

In this case, two wireless LAN antennas 71-1 and 71-2 are separated by a distance of around 160 mm (n=5). The short-range radio communication Bluetooth has no diversity function unlike a wireless LAN since it is a low-cost communication function, and one Bluetooth antenna 71-3 is mounted. To implement nondirectionality, the antenna 71-3 is preferably located near or at the center of the housing. Therefore, the Bluetooth antenna 71-3 is laid out between the two wireless LAN antennas 71-1 and 71-2, as shown in FIG. 11.

The connection arrangement among the two wireless LAN antennas 71-1 and 71-2 and Bluetooth antenna 71-3, the wireless LAN radio communication module 31, and the Bluetooth radio communication module 32 is as shown in FIG. 5.

Also, since the internal arrangements of the wireless LAN module 31 and Bluetooth module 32 are the same as those shown in FIGS. 6 and 7, a description thereof will be omitted.

Therefore, according to the notebook PC of this embodiment, since the Bluetooth antenna is laid out between two wireless LAN diversity antennas, the radiation performance of the Bluetooth radio antenna can be obtained, and the influences of fading on the two wireless LAN diversity antennas can be reduced.

Since the wireless LAN antennas and Bluetooth antenna are arranged on the upper portion of the liquid crystal panel, the display unit of the notebook PC can have a low-profile structure. Also, good radiation characteristics of the wireless LAN antennas and Bluetooth antenna can be obtained on both the front and back surface sides of the liquid crystal panel.

Since a GND pattern having a total perimeter length, which is $0.8\lambda$ to $1.25\lambda$ of the radio communication frequency, is formed on the antenna board of each of the wireless LAN antennas and Bluetooth antenna, good radiation characteristics can be obtained.

Furthermore, according to this embodiment, since the wireless LAN module and Bluetooth module are incorporated in the notebook PC main body, the display unit can have a low profile.

<Second Embodiment>

A notebook PC according to the second embodiment of the present invention will be described below.

In the first embodiment, the wireless LAN antennas and Bluetooth antenna are independently arranged. The notebook PC of this embodiment is characterized in that one antenna is commonly used as a wireless LAN antenna and Bluetooth antenna.

Figure 12:
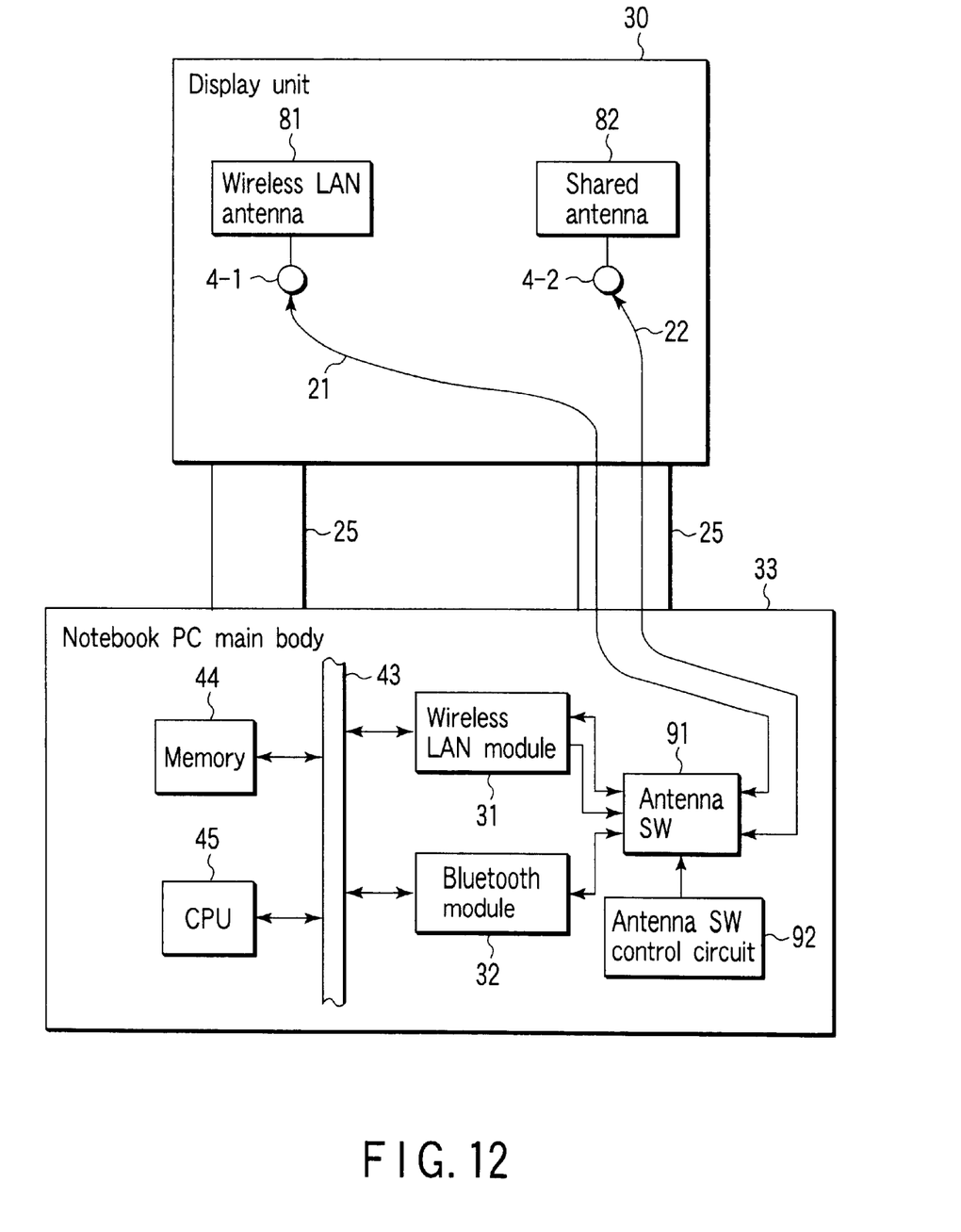
FIG. 12 is a block diagram showing the hardware arrangement of a notebook PC according to the second embodiment of the present invention.

FIG. 12 shows the hardware arrangement of the notebook PC according to the second embodiment of the present invention. Note that the same reference numerals denote the same parts as in FIG. 5. FIG. 12 illustrates only features of this embodiment, and does not illustrate a keyboard controller, display controller, and the like as original functions of the notebook PC.

As shown in FIG. 12, the notebook PC of this embodiment comprises, on a display unit 30, a wireless LAN antenna 81, and a shared antenna 82 which constructs diversity radio antennas in combination with the wireless LAN antenna 81, and also has a role of a Bluetooth antenna.

The wireless LAN antenna 81 and shared antenna 82 are mounted on the display unit of the notebook PC on the back surface side of the liquid crystal panel so that they are located on the upper portion of the liquid crystal panel, as in the first embodiment shown in FIGS. 2 and 3.

The notebook PC main body incorporates a wireless LAN radio communication module 31 and Bluetooth radio communication module 32, an antenna switch 91 between coaxial cables 21 and 22, and an antenna switch control circuit 92 for outputting a control signal that switches the antennas to the antenna switch 91.

Since the wireless LAN antenna 81 and shared antenna 82 form diversity antennas in combination, the distance between the antennas must satisfy $(2n+1)/4\lambda$ (n=1, 2, 3, ...) at $3/4\lambda$ or more ($\lambda$ is the wavelength of the radio communication frequency of the wireless LAN antenna) as in the wireless LAN antennas of the first embodiment.

The antenna switch control circuit 92 outputs, to the antenna switch 91 on the basis of an instruction from software such as an application program or the like or an instruction from a hardware switch provided to the notebook PC, a first control signal that instructs to use wireless LAN antennas, i.e., to connect the wireless LAN antenna 81 and shared antenna 82 to the wireless LAN radio communication module 31, or a second control signal to use a Bluetooth antenna, i.e., to connect the shared antenna 82 to the Bluetooth radio communication module 32.

The antenna switch 91 switches the connections of the antennas on the basis of the control signal from the antenna switch control circuit 92. More specifically, upon receiving the first control signal from the antenna switch control circuit 92, the antenna switch 91 connects the LAN antenna 81 and shared antenna 82 to the wireless LAN radio communication module 31. On the other hand, upon receiving the second control signal from the antenna switch control circuit 92, the antenna switch 91 connects the shared antenna 82 to the Bluetooth radio communication module 32.

Therefore, according to the notebook PC of this embodiment, since one of the wireless LAN diversity antennas is commonly used as the Bluetooth antenna, the number of antennas can be reduced, and a compact, low-cost notebook PC can be provided.

As described in detail above, according to the present invention, a portable information apparatus which can mount a plurality of antennas which are compatible to a plurality of radio communication schemes, and incorporates radio communication antennas which can obtain radiation characteristics with good balance on both the front and back surface sides of the portable information apparatus can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable information apparatus comprising:
   a main body of said portable information apparatus;
   a display unit attached to said main body of said portable information apparatus;
   a plurality of radio communication diversity antennas provided to said display unit; and
   a radio communication antenna which is provided to said display unit at a position between a pair of radio communication diversity antennas of said plurality of radio communication diversity antennas.

2. An apparatus according to claim 1, wherein said plurality of radio communication diversity antennas are wireless LAN antennas, and said radio communication antenna is a Bluetooth antenna.

3. An apparatus according to claim 1, wherein said display unit comprises a liquid crystal panel, and a housing fixing said liquid crystal panel, said plurality of radio communication diversity antennas are respectively attached to a plurality of first antenna boards, and said radio communication antenna is attached to a second antenna board, and said plurality of first antenna boards and said second antenna board are respectively attached to said housing on back surface side of said liquid crystal panel with said plurality of radio communication diversity antennas and said radio communication antenna being located on an upper portion of said liquid crystal panel to be separated by a predetermined spacing.

4. An apparatus according to claim 3, wherein each of said plurality of first antenna boards has a ground pattern, a total perimeter length of which is 0.8λ to 1.25λ of a radio communication frequency of said plurality of radio communication diversity antennas.

5. An apparatus according to claim 3, wherein said second antenna board has a ground pattern, a total perimeter length of which is 0.8λ to 1.25λ of a radio communication frequency of said radio communication antenna.

6. An apparatus according to claim 3, wherein said plurality of first antenna boards respectively comprise coaxial connectors connecting a first radio communication module provided to said main body of said portable information apparatus via coaxial cables, and said plurality of radio communication diversity antennas are connected to said coaxial connectors.

7. An apparatus according to claim 3, wherein said second antenna board comprises a coaxial connector connecting a second radio communication module provided to said main body of said portable information apparatus via a coaxial cable, and said radio communication antenna is connected to said coaxial connector.

8. An apparatus according to claim 3, wherein a distance between the plurality of radio communication diversity antennas satisfies $(2n+1)/\lambda(n=1, 2, 3, \ldots)$, where $\lambda$ is a wavelength of a radio communication frequency of the plurality of radio communication diversity antennas.

9. An antenna board which is arranged on back surface side of a liquid crystal panel of a display unit of a portable information apparatus to be separated a predetermined spacing from another antenna board and has a radio communication antenna arranged on an upper portion of the liquid crystal panel.

10. A board according to claim 9, further comprising a ground pattern, a total perimeter length of which is 0.8λ to 1.25λ of a radio communication frequency of the radio communication antenna.

11. A portable information apparatus comprising:

a main body of said portable information apparatus;

a display unit attached to said main body of said portable information apparatus;

diversity antennas provided to said display unit and including at least two antennas;

a first radio communication unit, connected to said diversity antennas, making a communication by a first radio communication scheme using a diversity function;

a second radio communication unit, connected to one of the at least two antennas, making a communication by a second radio communication scheme different from the first radio communication scheme; and a switching unit switching said first and second radio communication unit.

12. An apparatus according to claim 11, wherein said display unit comprises a liquid crystal panel, and a housing fixing said liquid crystal panel, the at least two antennas that form said diversity antennas are respectively attached to a plurality of antenna boards, and said plurality of antenna boards are attached to said housing on the back surface side of said liquid crystal panel with the antennas being located on an upper portion of said liquid crystal panel to be separated by a predetermined spacing.

13. An apparatus according to claim 12, wherein each of said plurality of antenna boards has a ground pattern, a total perimeter length of which is 0.8λ to 1.25λ of a radio communication frequency of said diversity antennas.

14. An apparatus according to claim 12, wherein said plurality of antenna boards respectively comprise coaxial connectors connecting a first radio communication module provided to said main body of said portable information apparatus via coaxial cables, and said diversity antennas are connected to said coaxial connectors.

15. An apparatus according to claim 11, further comprising a unit selecting said diversity antennas when the communication is made by said first radio communication unit, and selecting one of the at least two antennas when the communication is made by said second radio communication unit.

16. An apparatus according to claim 11, wherein a distance between the diversity antennas satisfies $(2n+1)/\lambda(n=1, 2, 3, \ldots)$, where A is a wavelength of a radio communication frequency of the diversity antennas.

* * * * *

UNITED STATES PATENT AND TRADEMARK OFFICE
CERTIFICATE OF CORRECTION

PATENT NO.     : 6,509,877 B2
DATED          : January 21, 2003
INVENTOR(S)    : Masaki It is certified that error appears in the above-identified patent and that said Letters Patent is hereby corrected as shown below:

Column 9,
Line 38, "$(2n+1)/\lambda(n=1, 2, 3, \ldots )$," should read -- $(2n+1)/\lambda$ $(n=1, 2, 3, \ldots )$, --.

Column 10,
Lines 45-46, "$(2n+1)/\lambda(n=1, 2, 3, \ldots )$," should read -- $(2n+1)/\lambda$ $(n=1, 2, 3, \ldots )$, --.
Line 46, "A is a wavelength" should read -- $\lambda$ is a wavelength --.

Signed and Sealed this

Eighth Day of July, 2003

JAMES E. ROGAN
*Director of the United States Patent and Trademark Office*